United States Patent
Song et al.

(10) Patent No.: US 6,242,086 B1
(45) Date of Patent: Jun. 5, 2001

(54) HIGH COERCIVITY, LOW NOISE MAGNETIC RECORDING MEDIUM COMPRISING AN INTERMEDIATE COCRTAOX LAYER

(75) Inventors: Xing Song, Mountain View; Qixu Chen, Milpitas; Charles Leu, Fremont; Rajiv Yadav Ranjan, San Jose, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/188,682

(22) Filed: Nov. 10, 1998

Related U.S. Application Data
(60) Provisional application No. 60/069,573, filed on Dec. 12, 1997.

(51) Int. Cl.[7] ................................................. G11B 5/738
(52) U.S. Cl. .................. 428/336; 428/469; 428/694 TS; 428/900; 204/192.2; 427/131
(58) Field of Search ................................... 428/336, 469, 428/694 TS, 694 TM, 900; 204/192.2; 427/131

(56) References Cited

U.S. PATENT DOCUMENTS

| | | | |
|---|---|---|---|
| 5,587,235 | * 12/1996 | Suzuki et al. | 428/332 |
| 5,952,097 | * 9/1999 | Zhang | 428/332 |

OTHER PUBLICATIONS

"NiA1 Underlayers for CoCrTa Magnetic Thin Films", L. Lee, et al., IEEE Transactions On Magnetics, vol. 30, No. 6, Nov. 1994, pp.3951–3953.

"Effects of Cr Intermediate Layers on CoCrPt Thin Film Media on NiA1 Underlayers", L. Lee, et al., IEEE Transactions On Magnetics, vol. 31, No. 6, Nov. 1995, pp. 2728–2730.

"Seed Layer Induced (002) Crystallographic Texture in NiA1 Underlayers", L. Lee, et al., J. Appl. Phys. 79(8), Apr. 15, 1996, pp. 4902–4904.

"The Control and Characterization of the Crystallographic Texture of Longitudinal Thin Film Recording Media", D. Laughlin, et al., IEEE Transactions On Magnetics, vol. 32, No. 5, Sep. 1996, pp. 3632–3637.

"The Role of NiA1 Underlayers in Longitudinal Recording Media" (abstract), C. Ross, et al., Journal of Applied Physics, vol. 81, No. 8, Apr. 15, 1997, p. 4639.

* cited by examiner

*Primary Examiner*—Stevan A. Resan
(74) *Attorney, Agent, or Firm*—McDermott, Will & Emery

(57) ABSTRACT

High areal density magnetic recording media are formed with a thin $CoCrTaO_x$ intermediate layer which provides appropriate crystalline orientation and surface morphology for the nucleation and growth of a magnetic layer thereon having increased coercivity and high squareness, while avoiding high substrate heating temperatures. Embodiments include sputter depositing an intermediate layer comprising Co, about 10 to about 20 atomic % Cr and about 1 to about 6 atomic % Ta, at a thickness of about 1.5 to about 18 Å on a Cr or Cr alloy underlayer, allowing partial oxidation of the surface of the intermediate layer by residual oxygen in the sputtering system, and then sputter depositing a CoCrPtTa magnetic alloy layer thereon.

19 Claims, 6 Drawing Sheets

| Ch1 | Ch2 | Ch6,7 | Ch9 | Ch10 | Ch11 | Ch16 | Ch20 |
|---|---|---|---|---|---|---|---|
| Load Chamber | Htr1 | Htr2 | Underlayer & Flash Layer Chamber | Exposure Chamber | Magnetic Layer Chamber | Overcoat Chamber | Unload Chamber |

FIG. 3

HIGH COERCIVITY, LOW NOISE MAGNETIC RECORDING MEDIUM COMPRISING AN INTERMEDIATE COCRTAOX LAYER

RELATED APPLICATIONS

This application claims priority from Provisional Patent Application Serial No. 60/069,573 filed Dec. 12, 1997, entitled "HIGH COERCIVITY CoCrPtTa MEDIA WITH A FLASH CoCrTaO$_x$ LAYER", the entire disclosure of which is hereby incorporated herein by reference.

This application contains subject matter related to subject matter disclosed in copending Application Ser. No. 09/188,681 filed on Nov. 10, 1998 now U.S. Pat. No. 6,150,016 to subject matter disclosed in copending application Ser. No. 09/188,715, filed on Nov. 10, 1998, the entire disclosures of which are incorporated herein by reference.

TECHNICAL FIELD

The present invention relates to magnetic recording media, such as thin film magnetic recording disks, and to a method of manufacturing the media. The invention has particular applicability to high areal density magnetic recording media exhibiting low noise, high remanent coercivity and high coercivity squareness.

BACKGROUND ART

The requirements for increasingly high areal recording density impose increasingly greater demands on thin film magnetic recording media in terms of remanent coercivity (Hr or Hcr), magnetic remanance (Mr), coercivity squareness (S*), medium noise, i.e., signal-to-noise ratio (SNR), and narrow track recording performance. It is extremely difficult to produce a magnetic recording medium satisfying such demanding requirements.

The linear recording density can be increased by increasing the Hr of the magnetic recording medium. However, this objective can only be accomplished by decreasing the medium noise, as by maintaining very fine magnetically non-coupled grains. Medium noise is a dominant factor restricting increased recording density of high density magnetic hard disk drives. Medium noise in thin films is attributed primarily to inhomogeneous grain size and intergranular exchange coupling. Accordingly, in order to increase linear density, medium noise must be minimized by suitable microstructure control.

A conventional longitudinal recording disk medium is depicted in FIG. 1 and comprises a substrate 10, typically an (Al)-alloy, such as an Al-magnesium (AlMg) alloy, plated with a layer of amorphous nickel-phosphorus (NiP). Alternative substrates include glass, ceramic and glass-ceramic materials, as well as graphite. There are typically sequentially sputter deposited on each side of substrate 10, an underlayer 11, 11', such as Cr or a Cr alloy, a magnetic layer 12, 12', such as a cobalt (Co)-based alloy, and a protective overcoat 13, 13', such as a carbon-containing overcoat. Typically, although not shown for illustrative convenience, a lubricant topcoat is applied on the protective overcoat 13, 13'.

It is recognized that the magnetic properties, such as Hr, Mr, S* and SNR, which are critical to the performance of a magnetic alloy film, depend primarily upon the microstructure of the magnetic layer which, in turn, is influenced by the underlying layers, such as the underlayer. It is also recognized that underlayers having a fine grain structure are highly desirable, particular for growing fine grains of hexagonal close packed (HCP) Co alloys deposited thereon.

It has been reported that nickel-aluminum (NiAl) films exhibit a grain size which is smaller than similarly deposited Cr films, which are the underlayer of choice in conventional magnetic recording media. Li-Lien Lee et al., "NiAl Underlayers For CoCrTa Magnetic Thin Films", IEEE Transactions on Magnetics, Vol. 30, No. 6, pp. 3951–3953, 1994. Accordingly, NiAl thin films are potential candidates as underlayers for magnetic recording media for high density longitudinal magnetic recording. However, it was found that the coercivity of a magnetic recording medium comprising an NiAl underlayer is too low for high density recording, e.g. about 2,000 Oersteds (Oe).

Lee et al. subsequently reported that the coercivity of a magnetic recording medium comprising a NiAl underlayer can be significantly enhanced by depositing a plurality of underlayers containing alternative NiAl and Cr layers rather than a single NiAl underlayer. Li-Lien Lee et al., "Effects of Cr Intermediate Layers on CoCrPt Thin Film Media on NiAl Underlayers," Vol. 31, No. 6, November 1995, pp. 2728–2730.

Li-Lien Lee et al. were able to obtain an underlayer exhibiting a (200)-dominant crystallographic orientation by initially depositing a Cr sub-underlayer directly on the non-magnetic substrate at a high temperature of about 260° C. using radio frequency (RF) sputtering. However, it is very difficult to obtain a Cr (200)-dominant crystallographic orientation, even at elevated temperature such as 260° C., on glass, ceramic and glass ceramic substrates using direct current (DC) magnetron sputtering, which is widely employed in the magnetic recording media industry.

Li-Lien Lee et al. subsequently reported that an underlayer structure exhibiting a (200)-dominant crystallographic orientation was obtained by depositing a magnesium oxide (MgO) seedlayer using radio frequency (RF) sputtering. Li-Lien Lee et al., "Seed layer induced (002) crystallographic texture in NiAl underlayers," J. Appl. Phys. 79 (8), Apr. 15, 1996, pp. 4902–4904; and David E. Laughlin et al., "The Control and Characterization of the Crystallographic Texture of the Longitudinal Thin Film Recording Media," IEEE Transactions on Magnetics, Vol. 32, No. 5, September 1996, pp. 3632≧3637. Such a magnetic recording medium, however is not commercially viable from an economic standpoint, because sputtering systems in place throughout the industry making magnetic recording media are based upon direct current (DC) sputtering. Accordingly, RF sputtering an MgO seedlayer is not economically viable. The use of an NiAl underlayer is also disclosed by C. A. Ross et al., "The Role Of An NiAl Underlayers In Longitudinal Thin Film Media" and J. Appl. Phys. 81(a), P.4369, 1996.

Conventional practices in manufacturing magnetic recording media comprise DC magnetron sputtering and high temperatures in order to obtain Cr segregation in Co-alloy grain boundaries to achieve high Hr and high SNR. Conventional practices, therefore, employ a high substrate heating temperature, e.g. above about 200° C., e.g. about 230° C. to about 260+ C., in order to achieve a desirably high Hr. However, such high substrate heating temperatures result in a reduced S* and, hence, increased medium noise.

Accordingly, there exists a need for high density magnetic recording media exhibiting high Hr with high S* and a high SNR. There also exists a need for efficient methodology for producing magnetic recording media exhibiting high Hr, high S* and a high SNR.

DISCLOSURE OF THE INVENTION

An object of the present invention is a magnetic recording medium for high areal recording density exhibiting high Hr and high S*.

Another object of the present invention is a method of manufacturing a magnetic recording medium for high areal recording density exhibiting high Hr and high S*.

Additional objects, advantages and other features of the present invention will be set forth in part in a description which follows and in part will become apparent to those having ordinary skill in the art upon examination of the following only to be learned from the practice of the present invention. The objects and advantages of the invention may be realized and obtained as particularly pointed out in the appended claims.

According to the present invention, the foregoing and other objects are achieved by a magnetic recording medium comprising: a non-magnetic substrate; an underlayer on the substrate; an intermediate layer comprising cobalt, chromium and tantalum and having an oxidized surface, on the underlayer; and a magnetic layer on the intermediate layer.

Another aspect of the present invention is a method of manufacturing a magnetic recording medium, the method comprising: depositing an underlayer on a non-magnetic substrate; depositing an intermediate layer, comprising an alloy of cobalt, chromium and tantalum, on the underlayer; partially oxidizing the surface of the intermediate layer; and depositing a magnetic layer on the oxidized surface of the intermediate layer.

Additional objects and advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the drawings and description are to be regarded as illustrative in nature, and not as restrictive.

BRIEF DESCRIPTION OF DRAWINGS

FIG. 3 schematically illustrates a sputtering system for use in the present invention.

DESCRIPTION OF THE INVENTION

Figure 1:
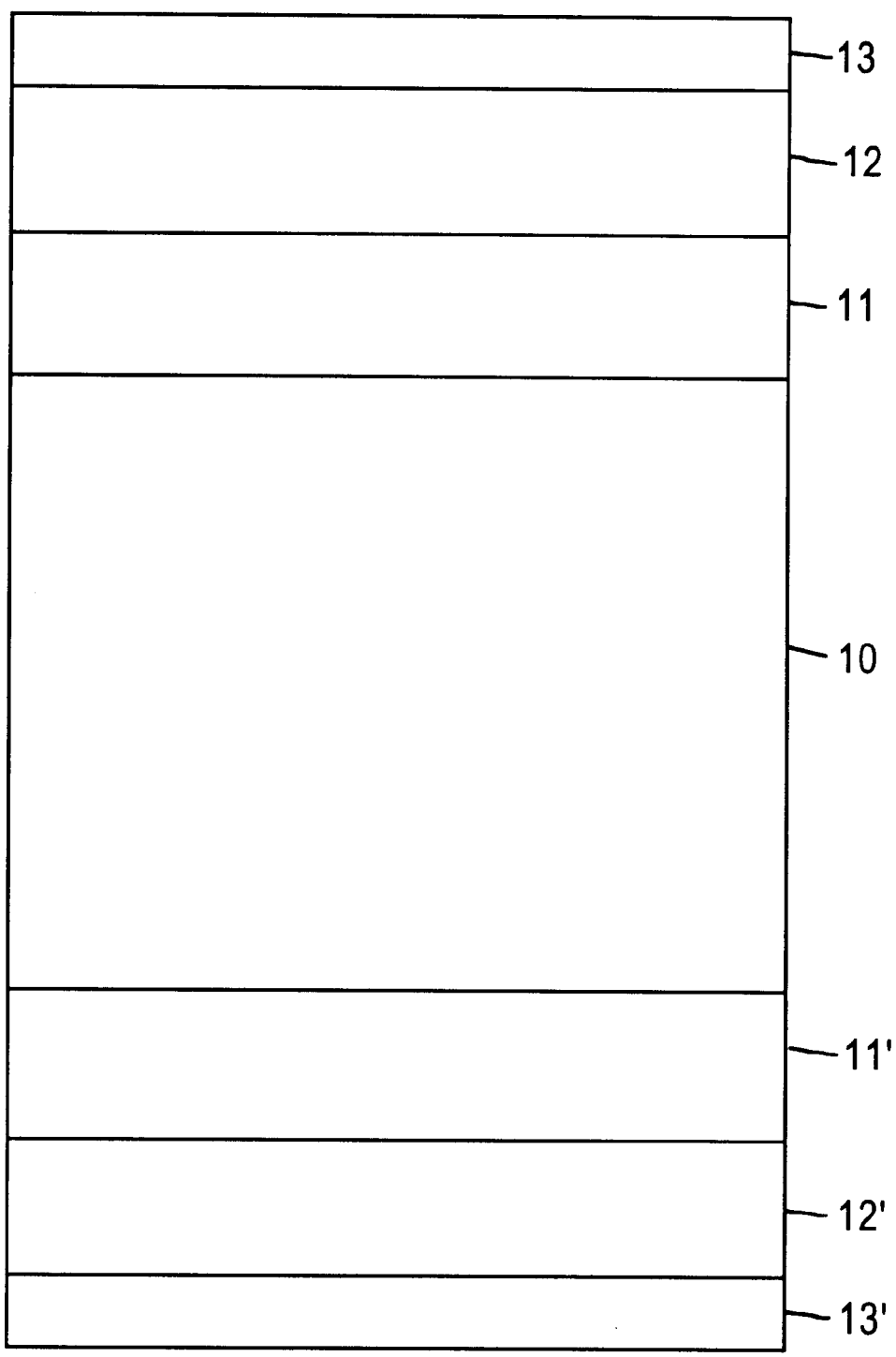
FIG. 1 schematically depicts a conventional magnetic recording medium structure.

The present invention provides magnetic recording media suitable for high areal recording density exhibiting high Hr and high S*. In accordance with embodiments of the present invention, desirably high Hr and S* are achieved by the strategic deposition of a thin magnetic Co-alloy containing Cr and tantalum (Ta), wherein Cr is present in an amount of about 10 atomic % up to about 20 atomic %, and having a partially oxidized surface. Embodiments of the present invention comprise depositing an intermediate Co-alloy containing about 10 atomic % up to about 15 atomic % Cr and about 1 atomic % up to about 6 atomic % Ta. The intermediate layer can be deposited at a thickness of about 1.5 Å to about 150 Å.

After extensive experimentation and investigation, it was found that deposition of a $CoCrTaO_x$ intermediate or flash layer comprising a partially oxidized surface provides appropriate crystalline orientation and surface morphology for nucleation and growth of the magnetic layer thereon, thereby resulting in an increased Hr while maintaining a high S*. The thin $CoCrTaO_x$ intermediate layer desirably induces a preferred (1120)-dominant crystallographic orientation in the subsequently deposited Co-alloy magnetic layer, thereby resulting in decreased medium noise. The thin $CoCrTaO_x$ intermediate layer also enables sputter deposition of a magnetic layer at a desirably lower temperature than conventional practices, such as less than 200° C., without sacrificing magnetic properties.

The present invention advantageously achieves high areal recording density with a high Hr and, significantly, a higher S* by providing a $CoCrTaO_x$ intermediate layer on an underlayer of a magnetic recording medium. A magnetic layer, e.g. CoCrTa or CoCrPtTa, is then sputter deposited on the oxidized flash layer.

The $CoCrTaO_x$ intermediate layer of the present invention can contain about 10 to about 20 atomic %, e.g. about 10 up to about 15 atomic % Cr, about 1 to about 6 atomic % Ta and about 0.01 to about 3 atomic % oxygen ($O_2$), i.e., about 0.01 to about 3 atomic % oxygen in the top 50 Å region which essentially constitutes the oxidized surface. The intermediate layer of the present invention is characterized by a partially oxidized surface which can be achieved by depositing an intermediate CoCrTa layer and then allowing the surface of the deposited intermediate layer to undergo oxidation by residual oxygen in the sputtering system, which residual oxygen can be present at a partial pressure not greater than about $5\times10^{-8}$ Torr.

The present invention involves the use of any of various substrate materials conventionally employed in the manufacture of magnetic recording media, such as NiP-plated Al or Al-alloys, e.g., AlMg, or glass, ceramic or glass-ceramic materials. The present invention also encompasses the use of any of various magnetic alloy layers conventionally employed in the manufacture of magnetic recording media, such as Co alloys, e.g. Co alloys containing Cr, platinum (Pt) and Ta, as well as CoCrTa magnetic alloy layers. In sputter depositing the magnetic layer on the intermediate layer, inclusive of CoCrTa magnetic layers, a defined interface is formed between the intermediate layer and the magnetic layer. The intermediate layer substrate surface provides appropriate crystalline orientation and surface morphology for nucleation and growth of the magnetic layer thereon. Advantageous results have been achieved employing $CoCr_{15}Pt_8Ta_4$ alloys as well as $CoCr_{15}Pt_5Ta_4$ magnetic alloys (the numerical designations indicating atomic percentages).

The present invention also encompasses the use of conventional adhesion layers, such as Cr or Cr-alloys, seedlayers, such as NiP, and underlayers, such as Cr and Cr-alloys, e.g., chromium-vanadium (CrV), chromium-titanium (CrTi), chromium-titanium boron (CrTiB) and chromium-tantalum oxide ($Cr-Ta_2O_5$), nickel aluminum (NiAl) and iron-aluminum (FeAl), as well as multilayered underlayers, such as CrV/Cr, CrV/NiAl/Cr, CrV/NiAl/Cr/$CrTa_2O_5$.

The strategic use of an intermediate $CoCrTaO_x$ layer with a partially oxidized surface in accordance with embodiments of the present invention enables sputter deposition of subsequently applied layers at lower substrate temperatures, to achieve a desirably high Hr without sacrificing S*. Thus, sputter deposition of magnetic layers and protective overcoats can be conducted at a temperature of about 100° C. to about 200° C.

Figure 2:
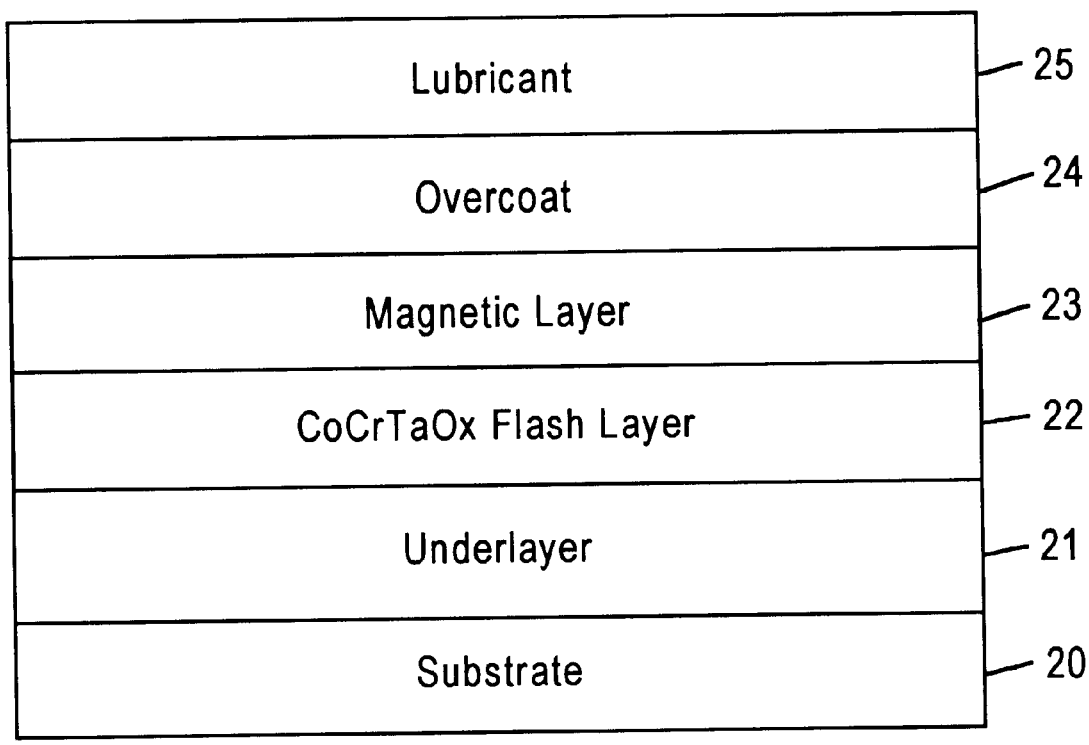
FIG. 2 schematically depicts a magnetic recording medium structure in accordance with an embodiment of the present invention.

An embodiment of the present invention is schematically illustrated in FIG. 2 and comprises substrate 20. For illustrative convenience, the sequentially deposited layers are shown only on one side of substrate 20. However, it is understood that the present invention comprises sputter depositing sequential layers on both sides of substrate 20, as in FIG. 1.

Adverting to FIG. 2, an underlayer 21, e.g. CrV, is sputter deposited on substrate 20, e.g., NiP-plated AlMg or a glass material. A thin CoCrTa intermediate layer 22 is sputter deposited on underlayer 21 and allowed to undergo partial surface oxidation by residual oxygen in the sputtering system. A magnetic layer 23, e.g. CoCrTa or CoCrPtTa, is then sputter deposited on the partially oxidized surface of intermediate layer 22. A carbon-containing protective overcoat 24 is sputter deposited on magnetic layer 23. A lubricant topcoat is then applied to protective overcoat 24.

An in-line sputtering system which can be employed in practicing the present invention is schematically illustrated in FIG. 3. A pallet containing a plurality of disks is initially introduced into the unload chamber (Ch1) and heated in any of one or more downstream chambers (Ch2, or Ch6, 7). The pallet is then conveyed to an underlayer deposition chamber (Ch9), wherein the underlayer deposition chamber, the underlayer and intermediate CoCrTa layer are sequentially deposited on the substrate. The underlayer target and the CoCrTa target are placed side by side, so that the time interval between deposition of the underlayer and intermediate layer is quite small, e.g. less than one second. The pallet is then conveyed through an exposure chamber (Ch 10) enroute to the magnetic layer deposition chamber (Ch 11), during which time the surface of the CoCrTa intermediate layer is allowed to undergo partial oxidation by virtue of residual $O_2$ in the system, to form the $CoCrTaO_x$ intermediate layer of the present invention. In the magnetic layer deposition chamber (Ch 11), the magnetic layer is sputter deposited on the $CoCrTaO_x$ intermediate layer. A carbon-protective overcoat, is sputter deposited on the magnetic layer in the overcoat deposition chamber (Ch 16). The pallet is then conveyed to the unload chamber (Ch16). The numerical designations for the chambers are employed for referencing convenience and do not necessarily represent the number of the chambers in the sputter deposition system.

Thus, in accordance with the present invention, an intermediate CoCrTa layer is sputter deposited on an underlayer, and oxidized by intentionally delaying deposition of the magnetic layer and allowing the surface of the CoCrTa layer to react with residual oxygen in the sputtering system, thereby forming the $CoCrTaO_x$ intermediate layer. The $CoCrTaO_x$ intermediate layer provides appropriate crystalline orientation and surface morphology for the nucleation and growth of a magnetic layer thereon, resulting in increased Hr, high S* and high SNR.

EXAMPLE 1

Figure 4:
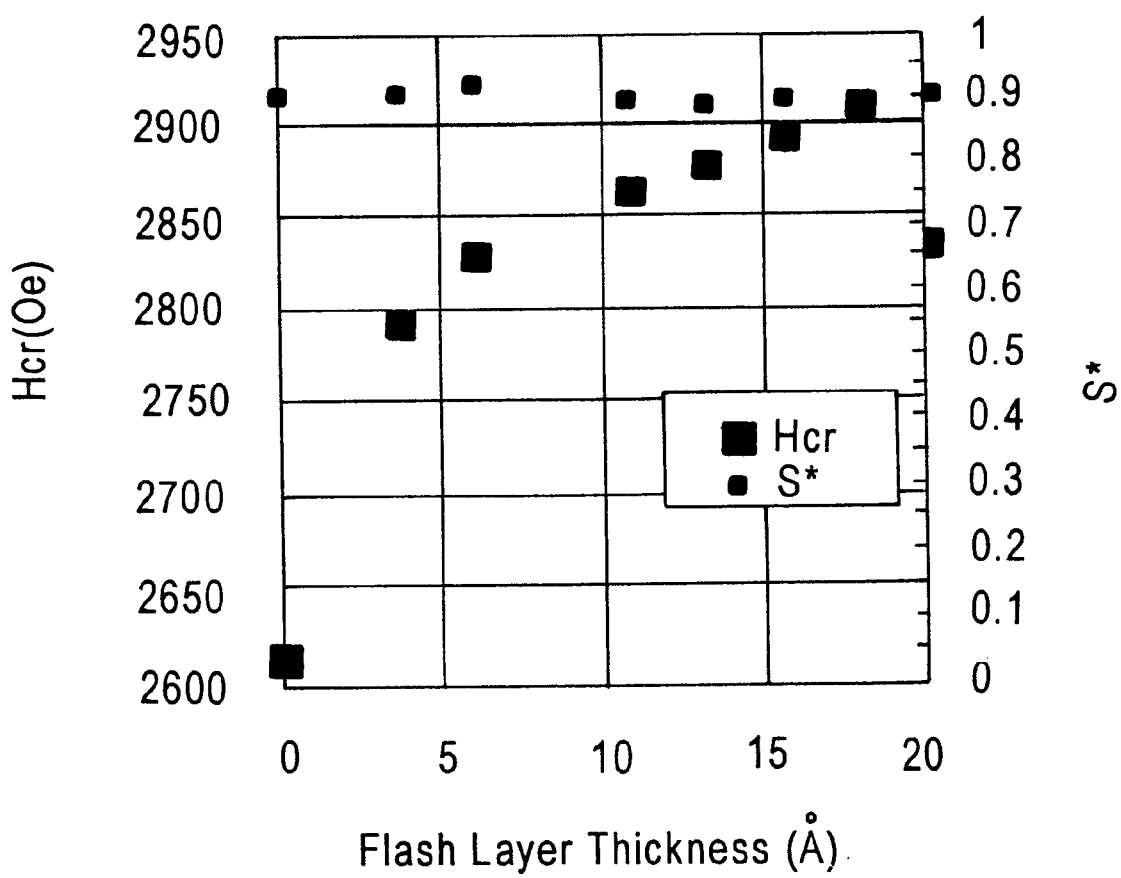
FIG. 4 illustrates the impact of the intermediate layer thickness on Hr and S* of a medium comprising a magnetic layer which does not contain platinum.

A magnetic recording medium was prepared comprising a Cr/CrV composite underlayer deposited on a Ni-PAl substrate, a $CoCrTaO_x$ intermediate (flash) layer and a $CoCr_{14}Ta_4$ magnetic layer. The Hr and S* were measured as a function of intermediate layer thickness and the results are reported in FIG. 4. It is apparent from FIG. 4 that a 4 Å intermediate $CoCrTaO_x$ layer enables an increase in Hr from 2600 Oe to 2800 Oe, while maintaining a suitably high S* of about 0.90.

EXAMPLE 2

Figure 5A:
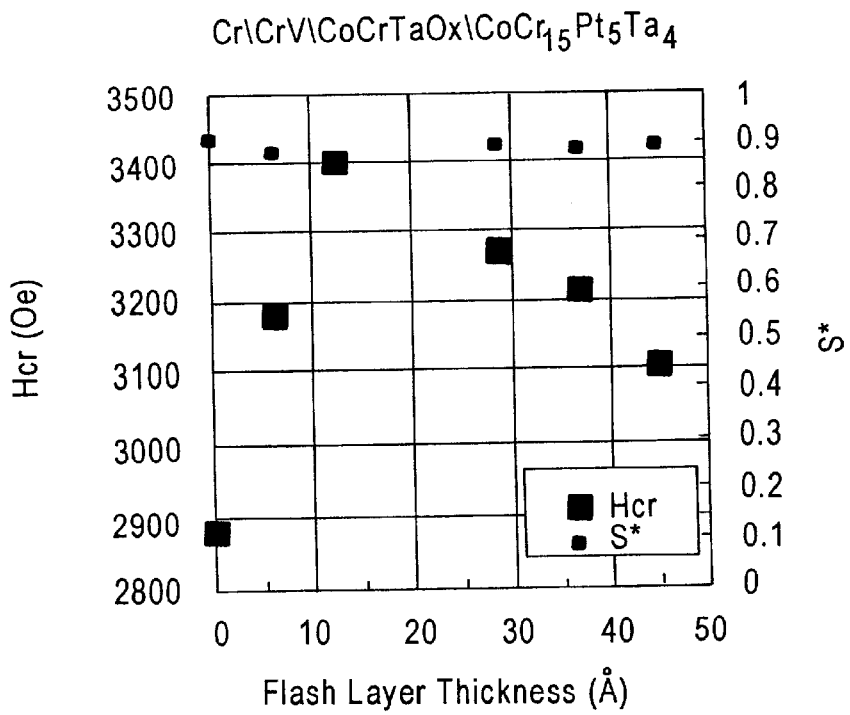
FIGS. 5A and 5B illustrate the impact of the intermediate layer thickness on Hr and S* of media containing magnetic layers having different platinum contents.
Figure 5B:
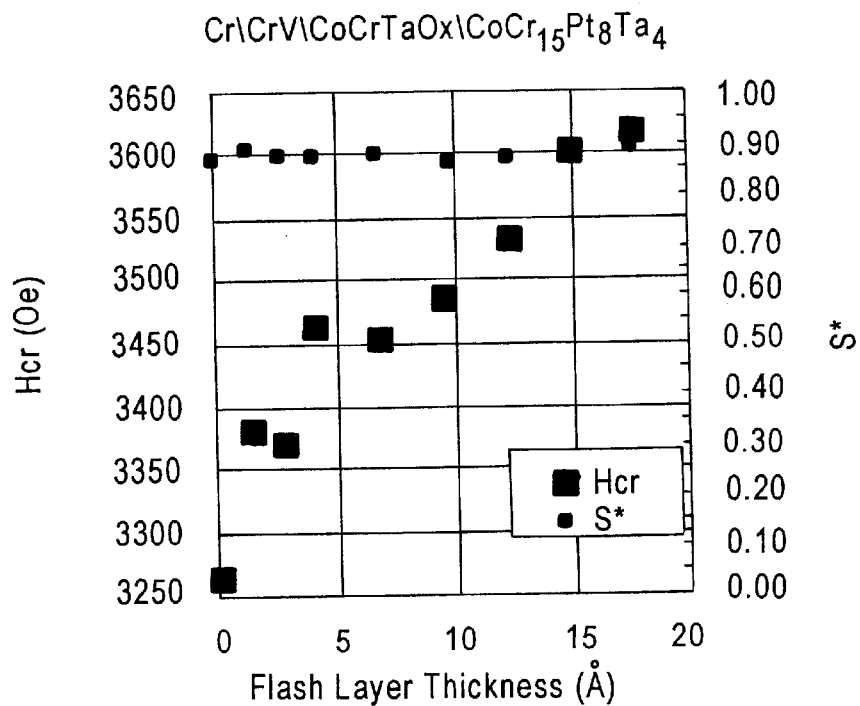

Two media were prepared, each comprising a NiP-plated Al substrate, a composite underlayer of Cr/CrV, and an intermediate (flash) layer of $CoCrTaO_x$. One medium comprised a magnetic alloy layer of $CoCr_{15}Pt_5Ta_4$ and the other medium comprised a magnetic alloy layer of $CoCr_{15}Pt_8Ta_4$. The Hr and S* were measured as a function of intermediate layer thickness and the results reported in FIGS. 5A and 5B. Adverting to FIG. 5A, for the magnetic recording medium containing a magnetic layer of $CoCr_{15}Pt_5Ta_4$ and a 5 Å intermediate layer, the Hr was increased by about 300 Oe from 2900 Oe to 3200 Oe, and a Hr peak of 3400 Oe was achieved at a $CoCrTaO_x$ intermediate layer thickness of about 12 Å. Adverting to FIG. 5B, for the medium containing a magnetic layer of $CoCr_{15}Pt_8Ta_4$ with a $CoCrTaO_x$ intermediate layer of about 1.5 Å to about 3 Å, the Hr increased by 150 Oe from 3250 Oe to 3400 Oe. An Hr greater than 3600 Oe can be obtained employing an 18 Å $CoCrTaO_x$ intermediate layer. Significantly, adverting to FIGS. 5A and 5B, a desirably high S* was maintained above 0.85.

EXAMPLE 3

Figure 6:
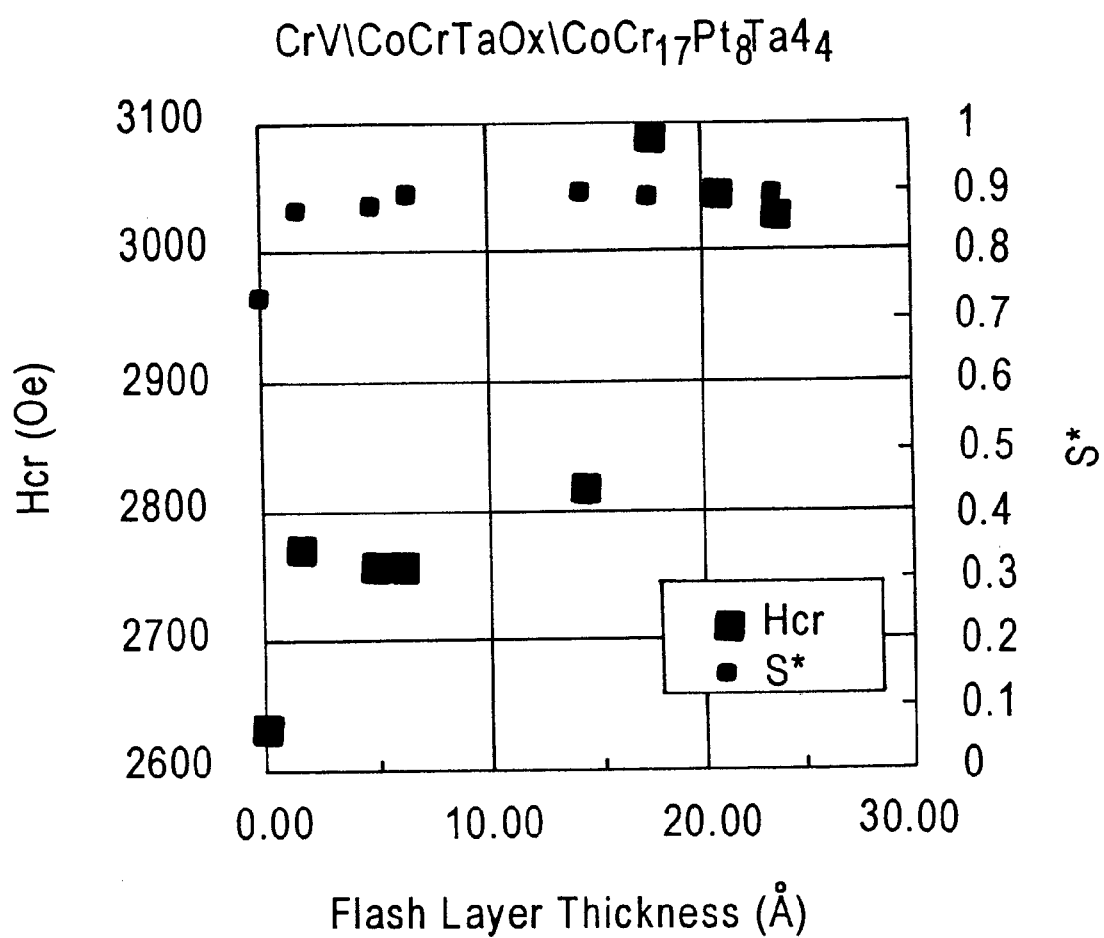
FIG. 6 illustrates the influence of the intermediate thickness on Hr and S* of a medium comprising a magnetic alloy layer sputtered on an aluminum substrate.

Magnetic recording media were prepared by sputter depositing a CrV underlayer on a NiP-plated Al substrate and depositing $CoCrTaO_x$ intermediate layers of varying thickness thereon. In each medium, the magnet layer comprised $CoCr_{17}Pt_8Ta_4$. The Hr and S* were measured as a function of $CoCrTaO_x$ intermediate layer thickness and the results are shown in FIG. 6. It is apparent from FIG. 6 that a $CoCrTaO_x$ intermediate layer thickness of 1.5 Å to 6 Å resulted in an increase of 130 Oe from 2630 Oe to 2760 Oe. An Hr of 3,100 Oe can be achieved by employing a $CoCrTaO_x$ intermediate layer having a thickness of 17 Å. Significantly, absent the $CoCrTaO_x$ intermediate layer, the S* was relatively low. However, by employing the $CoCrTaO_x$ intermediate layer of the present invention, the S* increased from 0.73 to an excess of 0.85.

The present invention provides high areal density magnetic recording media comprising a thin $CoCrTaO_x$ intermediate layer for appropriate crystalline orientation and surface morphology for the nucleation and growth of a magnetic layer thereon, thereby achieving increased Hr while maintaining or improving S*. The present invention is applicable to the production of various types of recording media, and is not limited to any particular substrate material, underlayer, magnetic layer, protective overcoat or lubricant topcoat.

Only certain embodiments of the present invention and but a few examples of its versatility are shown and described in the present disclosure. It is to be understood that the present invention s capable of use in various other combinations and environments and is capable of changes and modifications within the scope of the inventive concept as expressed herein.

What is claimed is:

1. A magnetic recording medium comprising:
   a non-magnetic substrate;
   an underlayer on the substrate;

an intermediate layer, comprising cobalt, chromium and tantalum and having an oxidized surface, directly on the underlayer; and a magnetic layer on the oxidized intermediate layer, wherein the oxidized intermediate layer has a total thickness of about 1.5 Å to about 18 Å.

2. The magnetic recording medium according to claim 1, wherein the intermediate layer comprises about 10 to about 20 atomic % chromium.

3. The magnetic recording medium according to claim 2, wherein the intermediate layer comprises about 1 to about 6 atomic % tantalum.

4. The magnetic recording medium according to claim 1, wherein the magnetic layer comprises cobalt, chromium, platinum and tantalum.

5. The magnetic recording medium according to claim 1, wherein the underlayer comprises chromium or a chromium alloy.

6. The magnetic recording medium according to claim 1, wherein the substrate comprises a nickel-phosphorous plated aluminum or aluminum alloy, or a glass, ceramic, or glass-ceramic material.

7. The magnetic recording medium according to claim 1, wherein the oxidized intermediate layer has a thickness of about 1.5 Å to about 6 Å.

8. The magnetic recording medium according to claim 7, exhibiting a remanent coercivity greater than about 2,850 Oe and a coercivity squareness not less than about 0.80.

9. A method of manufacturing a magnetic recording medium, the method comprising:

depositing an underlayer on a non-magnetic substrate;

depositing an intermediate layer, comprising an alloy of cobalt, chromium and tantalum, directly on the underlayer;

partially oxidizing the surface of the intermediate layer; and depositing a magnetic layer on the oxidized surface of the intermediate layer, wherein the oxidized intermediate layer has a total thickness of about 1.5 Å to about 18 Å.

10. The method according to claim 9, comprising oxidizing the surface of the intermediate layer by exposing the intermediate layer to an oxygen partial pressure not greater than about $5 \times 10^{-8}$ Torr.

11. The method according to claim 9, comprising:

conveying the non-magnetic substrate to an underlayer deposition chamber;

sequentially sputter depositing the underlayer and intermediate layer on the substrate in the underlayer deposition chamber;

conveying the substrate to an exposure chamber while permitting residual oxygen to react with the deposited intermediate layer thereby oxidizing the surface of the intermediate layer; and sputter depositing the magnetic layer on the oxidized intermediate layer in the magnetic layer deposition chamber.

12. The method according to claim 9, wherein the intermediate layer contains about 10 to about 20 atomic % chromium.

13. The method according to claim 12, wherein the intermediate layer contains about 1 to about 6 atomic % tantalum.

14. The method according to claim 9, wherein the magnetic layer comprises an alloy of cobalt, chromium, platinum and tantalum.

15. The method according to claim 9, wherein the underlayer comprises chromium or a chromium alloy.

16. The method according to claim 9, wherein the substrate comprises a nickel-phosphorus plated aluminum or aluminum alloy, or a glass, ceramic or glass-ceramic material.

17. The method according to claim 9, wherein the oxidized intermediate layer at a thickness of about 1.5 Å to about 6 Å.

18. The magnetic recording medium according to claim 7, wherein the oxidized intermediate layer has a thickness of about 1.5 Å.

19. The method according to claim 17, wherein the oxidized intermediate layer has a thickness of about 1.5 Å.

* * * * *